United States Patent
Klein et al.

(10) Patent No.: US 6,804,211 B1
(45) Date of Patent: Oct. 12, 2004

(54) FRAME STRUCTURE FOR AN ADAPTIVE MODULATION WIRELESS COMMUNICATION SYSTEM

(75) Inventors: Israel Jay Klein, San Diego, CA (US); Kenneth L. Stanwood, Cardiff by the Sea, CA (US); Steve Pollmann, Santee, CA (US); Frederick W. Price, Carlsbad, CA (US); Rami Hadar, San Diego, CA (US); Eli Arviv, Modi'in (IL); David Gazelle, Givat Shmuel (IL); Sheldon Gilbert, San Diego, CA (US)

(73) Assignee: Wi-Lan Inc., Calgary (CA)

( * ) Notice: Subject to any disclaimer, the term of this patent is extended or adjusted under 35 U.S.C. 154(b) by 0 days.

(21) Appl. No.: 09/365,917

(22) Filed: Aug. 3, 1999

(51) Int. Cl.$^7$ ................................................ H04Q 7/00
(52) U.S. Cl. ........................ 370/329; 370/280; 370/341
(58) Field of Search ................................ 370/441, 442, 370/332, 333, 335, 337, 280, 347, 329, 341, 342, 343, 465, 345; 375/271, 302

(56) References Cited

U.S. PATENT DOCUMENTS 4,495,619 A   1/1985   Acampora (List continued on next page.)

FOREIGN PATENT DOCUMENTS

EP   0507384 A2   3/1992   ............ H04B/7/26

(List continued on next page.)

OTHER PUBLICATIONS

Sampei, et al., Adaptive Modulation/TDMA Scheme for Personal Multi–Media Communication System , Proceedings of the Global Telecommunications Conference, U.S., New York, IEEE, Nov. 28, 1994, pp. 989–993.

(List continued on next page.)

Primary Examiner—Sonny Trinh
(74) Attorney, Agent, or Firm—Procopio, Cory, Hargreaves & Savitch LLP (57) ABSTRACT

A method of assigning downlink time slots to receive units where the units may generate data using different modulation schemes. The method preferably assigns the downlink time slots as a function of the complexity of modulation schemes employed by the units. Further, the method preferably assigns the time slots from the least complex modulation scheme to the most complex scheme. The method may further assign uplink time slots to transmit units where the transmit units may generate data using different modulation schemes. The method preferably assigns the uplink time slots as a function of the complexity of modulation schemes employed by the uplink units. Further, the method preferably assigns the uplink time slots from the least complex modulation scheme to the most complex scheme. In other embodiments, the downlink time slots are assigned as a function of the bit per symbol rate employed by the receive units, preferably from the lowest bit per symbol rate to the highest bit per symbol rate. Further, the uplink time slots are assigned as a function of the bit per symbol rate employed by the transmit units, preferably from the lowest bit per symbol rate to the highest bit per symbol rate. The present invention is also a method of simplifying the encoding of a predetermined number of bits of data into frames. The method adds error coding bits so that a ratio of the frame length times the baud rate of the frame times the bit packing ratio of the data divided the total bits of data is always an integer. The method may also convolutionally encode the bits of data so that the same equation is also always an integer. The present invention is also a method of updating the weights of a FIR filter where the filter processes symbols having variable modulation rates. When the modulation rate of the incoming symbols changes, the weights corresponding to the first symbol having the new modulation rate are changed based as the symbol propagates through the filter.

25 Claims, 7 Drawing Sheets

U.S. PATENT DOCUMENTS

| | | | |
|---|---|---|---|
| 5,297,144 A | | 3/1994 | Gilbert et al. ............. 370/95.2 |
| 5,444,698 A | | 8/1995 | Kito ............. 370/29 |
| 5,615,212 A | | 3/1997 | Ruszczyk et al. ............ 370/433 |
| 5,638,371 A | | 6/1997 | Raychaudhuri et al. ...... 370/347 |
| 5,638,374 A | | 6/1997 | Heath ............. 370/322 |
| 5,675,573 A | | 10/1997 | Karol et al. ............. 370/230 |
| 5,751,708 A | | 5/1998 | Eng et al. ............. 370/389 |
| 5,828,695 A | | 10/1998 | Webb |
| 5,909,469 A | * | 6/1999 | Frodigh et al. ............. 375/302 |
| 6,011,786 A | * | 1/2000 | Dent ............. 370/330 |
| 6,016,311 A | | 1/2000 | Gilbert et al. ............. 370/280 |
| 6,094,421 A | | 7/2000 | Scott ............. 370/280 |
| 6,167,031 A | * | 12/2000 | Olofsson et al. ............. 370/252 |
| 6,233,231 B1 | * | 5/2001 | Felix et al. ............. 370/335 |
| 6,359,934 B1 | * | 3/2002 | Yoshida ............. 375/262 |
| 6,400,755 B1 | * | 6/2002 | Harris et al. ............. 375/146 |
| 6,452,964 B1 | * | 9/2002 | Yoshida ............. 375/222 |
| 6,463,107 B1 | * | 10/2002 | Lindoff et al. ............. 375/343 |
| 6,549,759 B2 | * | 4/2003 | Arviv et al. ............. 455/69 |

FOREIGN PATENT DOCUMENTS

| | | | |
|---|---|---|---|
| EP | 0845916 A2 | 12/1997 | ............ H04Q/7/36 |
| EP | 0891060 A2 | 6/1998 | ............ H04L/27/00 |
| EP | 0944200 A2 * | 9/1999 | ............ H04L/1/12 |
| WO | WO 97/13388 * | 4/1997 | ............ H04Q/7/38 |
| WO | WO9222162 | 12/2002 | ............ H04L/27/34 |

OTHER PUBLICATIONS

Ue, et al., Symbol Rate and Modulation Level Controlled Adaptive Modulation/TDMA/TDD for Personal Communication Systems , Proceedings of the Vehicular Technology Conference, U.S., New York, IEEE, vol. Conf. 45, Jul. 25, 1995, pp. 306–310.

* cited by examiner

FRAME STRUCTURE FOR AN ADAPTIVE MODULATION WIRELESS COMMUNICATION SYSTEM

BACKGROUND OF THE INVENTION

1. Field of the Invention

This invention relates to frame structures for communication systems and more particularly to frame structures for adaptive modulation wireless communication systems.

2. Description of Related Art

A wireless communication system facilitates two-way communication between a plurality of customer premises equipment ("CPE") and a network infrastructure. Exemplary systems include mobile cellular telephone systems, personal communication systems (PCS), and cordless telephones. The objective of these wireless communication systems is to provide communication channels on demand between the users connected to a CPE and a base station in order to connect the user of a CPE with a network infrastructure (usually a wired-line system). In multiple access wireless schemes, the basic transmission unit is commonly frames of time. The frames are commonly divided into a plurality of time slots. The time slots of the frames may hold different kinds of data including control data and user information or data. In order to manage the use of the time slots of a frame, the time slots may be assigned or allocated to one or more CPEs. In this case, a CPE receiving or having an allocation of time slots may parse the allocation of the slots between one or more users associated with the CPE. CPEs typically communicate with a base station using a "duplexing" scheme that allows for the exchange of information in both directions of connection. In this scheme, the time slots of each frame may be allocated to data being transmitted from a base station to CPEs and to data being transmitted from CPEs to a base station.

Transmissions from a base station to a CPE are commonly referred to as "downlink" transmissions. Transmissions from a CPE to a base station are commonly referred to as "uplink" transmissions. Prior art wireless communication systems typically employ time division duplexing (TDD) to facilitate the exchange of information between base stations and CPEs where TDD is well known in the art. In TDD systems, duplexing of transmissions between a base station and associated CPEs is performed in the time domain. Further, the CPEs typically communicate with their associated base station with signals having a specific pre-defined radio frequency. In TDD systems, the bandwidth or channel of the signal is time-divided into frames having repetitive time periods or time "slots". The time slots are employed for uplink and downlink transmissions between the base station and associated CPEs.

When a wireless system is implemented in a region, the region is commonly divided into cells with a base station located within each cell. Each base station in a cell of the wireless system ideally provides communication between CPEs located in the cell. The size or configuration of a cell is generally determined as a function of the physical location of the base station, the location of buildings and other physical obstructions within the cell. The maximum bit per symbol rate modulation scheme that may be employed with a cell may be limited due to channel interference and the implementation or modem complexity of CPEs within the cell. Channel interference may occur between adjacent time slots assigned to different CPEs within a cell due to distortion of signals between the base station in the cell and the CPEs. The signals are commonly distorted by destructive multi-path replication of the signals (where the signals are reflected off physical objects in the cell). In addition, the signals are commonly distorted by atmospheric conditions (such as rain). Thus, in order to have duplex communications between all CPEs associated with a base station in a cell, a modulation scheme having a bit per symbol rate that enables communication between all CPEs associated with the base station is selected.

It is noted, however, that the channel interference between CPEs and a base station varies for each CPE, e.g., as a function of the physical barriers between the base station and the CPE. Consequently, the maximum bit per symbol rate modulation scheme (i.e., having acceptable error rates given the channel interference) that may be used to communicate between each CPE and the base station may vary. In addition, the implementation or modem complexity of the CPEs associated with the base station may also vary where some CPEs may be able to support higher bit per symbol rate modulation schemes than others associated with the base station. Accordingly, the selection of one low bit per symbol rate modulation scheme for all CPEs where some CPEs may support a higher bit per symbol rate modulation in a cell may not maximize bandwidth utilization. The use of different or variable bit per symbol rate modulation schemes for different CPEs associated with a cell may increase bandwidth utilization. Unfortunately, variable bit per symbol rate modulation is not used for communication between base stations and associated CPEs due to its complexity. In particular, variable bit per symbol rate modulation schemes normally require complex CPE demodulators where some CPEs may already have limited implementation or modem complexity. The need thus exists for frame structures and frame construction techniques that enable variable bit per symbol rate modulation for CPEs and base stations within a cell that does not increase the complexity of CPEs. The present invention provides such a frame structure and frame construction techniques.

SUMMARY OF THE INVENTION

The present invention includes a method that orders or assigns downlink time slots based on the complexity of the modulation data to be stored in the downlink time slots. Preferably, the downlink time slots are sorted from the least complex modulation scheme to the most complex modulation scheme. In one embodiment, the method assigns portions of at least two downlink time slots to at least two receiving units where the modulation scheme employed by the at least two units may vary. The method first determines the complexity of the modulation scheme employed by the at least two units. Then the method assigns portions of the at least two time slots to the at least two units based on the complexity of the modulation scheme they employ. As noted, ideally, portions of the at least two downlink time slots are assigned from the least complex modulation scheme to the most complex modulation scheme. In other embodiments, the method may first order the at least two units as a function of the complexity of the modulation scheme they employ. Then this method may assign portions of the at least two time slots based on the order of the at least two units.

The method may further order uplink time slots of a frame based on the complexity of the modulation data to be stored in the uplink time slots. Preferably, the uplink time slots are also sorted from the least complex modulation scheme to the most complex modulation scheme. In one embodiment, the method assigns at least two uplink time slots to at least two transmitting units where the modulation scheme employed by the at least two transmitting units may vary. The method first determines the complexity of the modulation scheme employed by the at least two transmitting units. Then the method assigns the at least two time slots to the at least two transmitting units based on the complexity of the modulation scheme they employ. As noted, ideally, the at least two uplink time slots are assigned from the least complex modulation scheme to the most complex modulation scheme. In other embodiments, the method may first order the at least two transmitting units as a function of the complexity of the modulation scheme they employ. Then this method may assign the at least two uplink time slots based on the order of the at least two transmitting units.

The present invention also includes a method that orders downlink time slots based on the bit per symbol rate of the modulation scheme employed to generate the data to be stored in the downlink time slots. Preferably, the downlink time slots are sorted from the lowest bit per symbol rate modulation scheme to the highest bit per symbol rate modulation scheme. In one embodiment, the method assigns portions of at least two downlink time slots to at least two receiving units where the bit per symbol rate modulation scheme employed by the at least two units may vary. The method first determines the bit per symbol rate of the modulation schemes employed by the at least two units. Then the method assigns portions of the at least two time slots to the at least two units based on the bit per symbol rate modulation schemes they employ. As noted, ideally, portions of the at least two downlink time slots are assigned from the lowest bit per symbol rate to the highest bit per symbol rate. In other embodiments, the method may first order portions of the at least two units as a function of the bit per symbol rate of the modulation schemes they employ. Then this method may assign portions of the at least two time slots based on the order of the at least two units.

The method may further order uplink time slots of a frame based on the bit per symbol rate of the modulation scheme employed to generate the data to be stored in the uplink time slots.

Preferably, the uplink time slots are also sorted from the lowest bit per symbol rate to the highest bit per symbol rate. In one embodiment, the method assigns at least two uplink time slots to at least two transmitting units where the bit per symbol rate of the modulation scheme employed by the at least two transmitting units may vary. The method first determines the bit per symbol rate of the modulation scheme employed by the at least two transmitting units. Then the method assigns the at least two time slots to the at least two transmitting units based on the bit per symbol rate of the modulation scheme they employ. As noted, ideally, the at least two uplink time slots are assigned from the lowest bit per symbol rate modulation scheme to the highest bit per symbol rate modulation scheme. In other embodiments, the method may first order the at least two transmitting units as a function of the bit per symbol rate modulation scheme they employ. Then this method may assign the at least two uplink time slots based on the order of the at least two transmitting units.

The present invention also includes a method of determining the encoding Ld bits of data into a frame. The frame has a time length T and the frame is transmitted at a baud rate R. The method first determines the maximum fixed bit per symbol rate of modulation for the Ld bits of data. Then the method adds x error code bits where $(R*T*Bi)/(Ld+x)$ is an integer where Bi is the bit per symbol rate of the modulation scheme employed. It is noted that x may have a minimum value based on a minimum block error rate. Further, the x error code bits may be Reed-Solomon encoded error bits. In other embodiments, the method may determine the maximum bit per symbol rate, Bi of modulation scheme for the Ld bits of data. Then the method may add x error code bits where $(R*T*Bi)/(Ld+x)$ is an integer.

In a further embodiment, the method first selects a convolution ratio where the selected convolution ratio adds y convolution bits to the Ld bits of data after the convolution encoding of the Ld bits of data. Then the method adds x error code bits where $(R*T*Bi)/(Ld+x+y)$ is an integer. It is noted that in this method the convolution ratio may be modified so that $(R*T*Bi)/(Ld+x+y)$ is an integer. In addition, the number of x error bits may be selected so that $(R*T*Bi)/(Ld+x+y)$ is an integer.

The present invention also includes a method for determining the modulation scheme of a frame having a plurality of downlink time slots where one of the plurality of downlink slots contains control information. In this method the modulation scheme employed to generate the modulated data for the plurality of downlink time slots may vary for each of the plurality of downlink slots. In addition, the frame may be transmitted to a plurality of units where each of the plurality of units may support a modulation scheme having a maximum complexity. This method first determines the lowest modulation complexity supported by each of the plurality of units. Then the method sets the modulation complexity of the downlink slot of the plurality of downlink slots that contains control information to the determined lowest modulation complexity.

In this method, the downlink slot of the plurality of downlink slots that contains control information may be the first downlink slot in time order of the plurality of downlink slots. In addition, the method may also determine the complexity of the modulation scheme employed to generate the modulated data for at least two units of the plurality of units. Then the method may assign at least two time slots of the plurality of time slots to the at least two units based on the complexity of the modulation scheme employed to generate the modulated data for the at least two units. The assignment to the at least two units may be from the least complex modulation scheme to the most complex modulation scheme.

The present invention also includes a method for setting the values of weights of finite impulse response filter. In this case, the filter receives symbols having variable modulation rates and stores a plurality of the symbols where each stored symbol has a corresponding weight. The method first determines when a first symbol is received having a modulation rate different than the last stored symbol. Then the method changes the value of the weight that corresponds to the first symbol based on the modulation rate of the first symbol. The method may further include receiving a second symbol having a modulation rate the same as the modulation rate of said first symbol. Followed by changing the value of the weight that corresponds to the first symbol based on the modulation rate of the first symbol. More generally, the method changes the value of the weights that correspond to the first symbol based on the modulation rate of the first symbol as the first symbol propagates through the filter.

The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Figure 1:
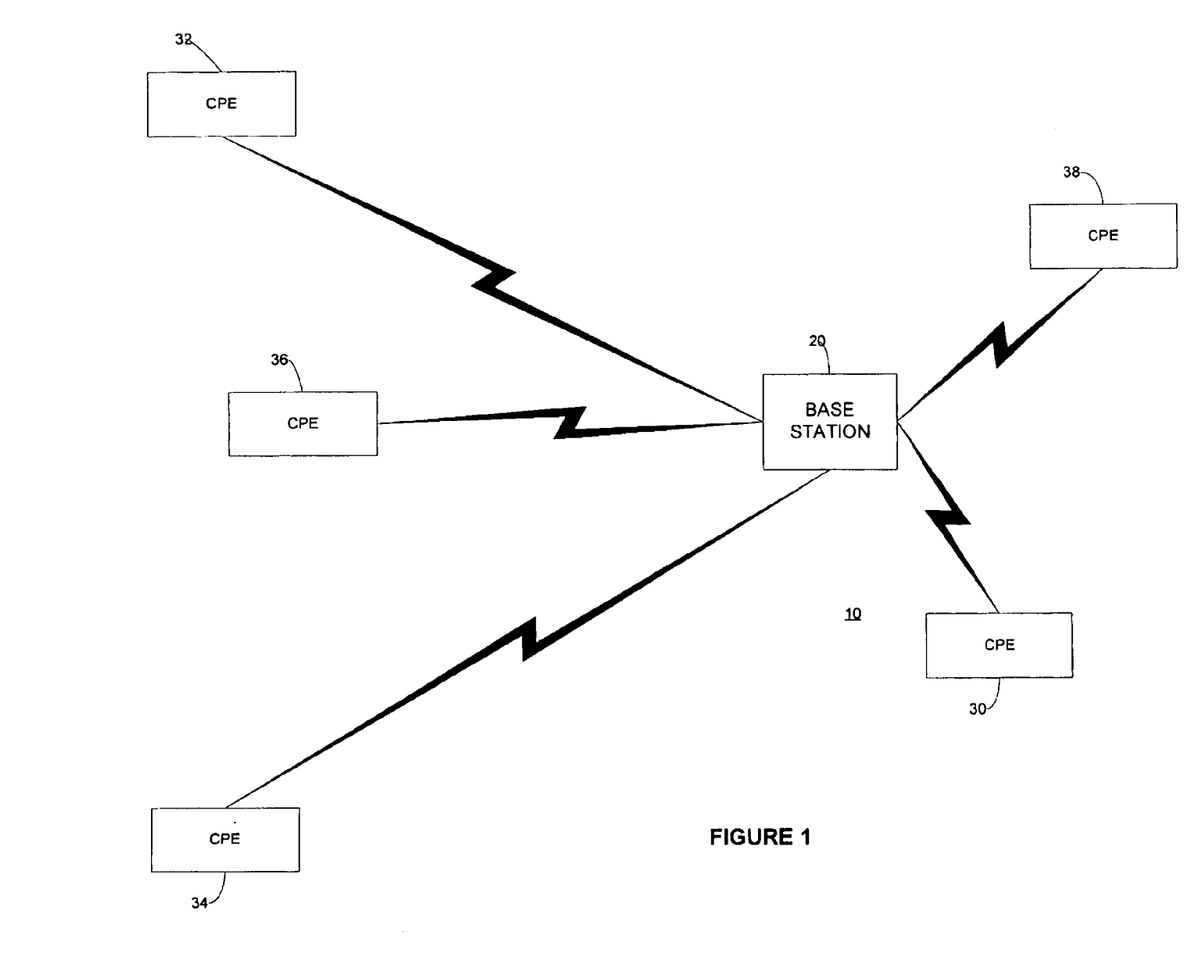
FIG. 1 is a diagram of an exemplary cell configuration with a base station and several CPEs associated with the cell.

The present invention includes an improved frame structure and a process of generating a frame structure for use in wireless communication systems employing adaptive modulation. Adaptive modulation includes varying the bit per symbol rate modulation scheme or modulation complexity of signals transmitted between a CPE and a base station as a function of channel interference of the signals or implementation or modem complexity of the CPE. FIG. 1 is a diagram of an exemplary cell 10 that includes a base station 20 located centrally in the cell 10 and a plurality of CPEs 30, 32, 34, 36, 38 associated with the base station. FIG. 1 does not shown buildings or other physical obstructions (such as trees or hills, for example), that may cause channel interference between signals of the CPEs.

As described above, the maximum bit per symbol rate modulation scheme or technique or most complex modulation scheme selected for use in the cell 10 is normally determined as a function of the channel interference between CPEs and the implementation or modem complexity of the CPEs. As also described above, the selection of a single maximum bit per symbol rate modulation technique based on the lowest bit per symbol rate modulation scheme supported by all CPEs may not optimize bandwidth utilization within the cell 10. In particular, lower channel interference between some CPEs (such as units 38, 30 for example), may permit the use of a higher bit modulation technique or more complex modulation scheme that has an error level below the maximum desirable error level. Adaptive bit-rate modulation or variable bit-rate modulation between different CPEs, however, usually requires complex transmitters and receivers in the CPEs where the CPEs may already have limited implementation or modem complexity.

As noted above, the frame structure is divided into a plurality of downlink and uplink slots. Each downlink time slots may be used to store data to be received by a number of users where a user identifies their data by an address or other label. Uplink time slots are commonly assigned to individual users for transmission of data from the user to another user or system via the base station. To maximize bandwidth utilization and minimize modulator complexity in the base station and associates CPEs, the present invention simplifies the configuration of data to inserted into the time slots. Briefly, data blocks are ideally parsed into an integer number of time slots. This process is described in detail below with reference to FIG. 4. Second, the present invention, orders or sorts the placement of data in the downlink and uplink time slots are a function of modulation complexity or bit per symbol rate modulation scheme employed to generate the data to be placed in the time slots. As described below with reference to FIG. 3, this technique reduces the complexity of CPE modulators and the number of modulation scheme transitions in a frame.

Figure 2:
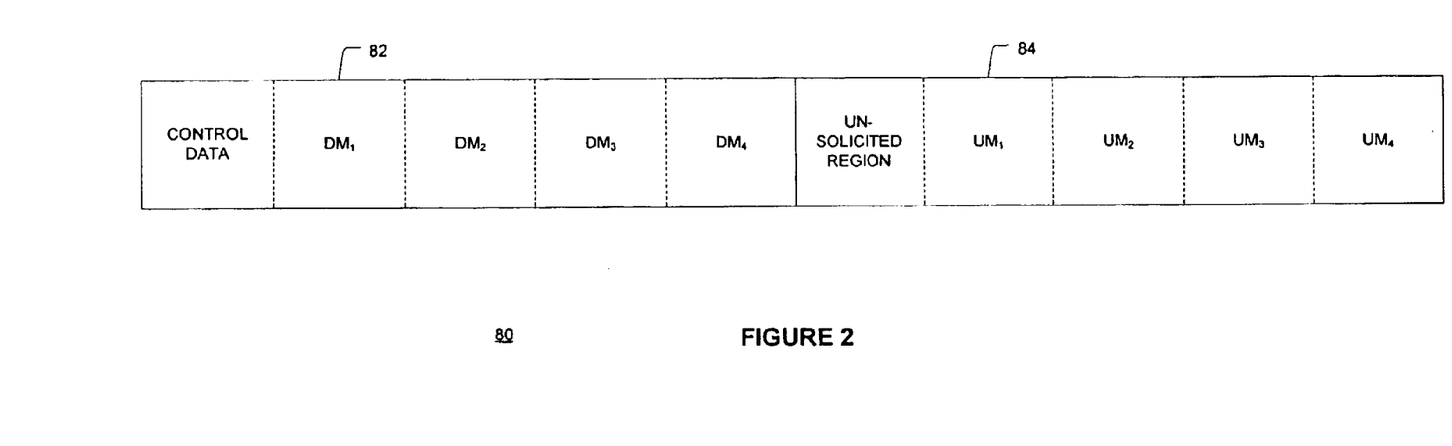
FIG. 2 is a diagram an exemplary time division duplex ("TDD") frame in accordance with the present invention.

FIG. 2 is diagram of an exemplary frame structure to be employed in a cell that enables adaptive bit per symbol rate modulation schemes to be employed in a frame structure without increasing the complexity of receivers and transmitters of CPEs associated with the cell and reducing the number of modulation scheme transitions within each frame. As shown in FIG. 2, the frame 80 includes a plurality of time slots. In this example there are ten time slots where the first five time slots contain downlink data 82 (from the base station 10), and the remaining five time slots contain uplink data 84 (to the base station 10 from a CPE). In this example, the downlink slots have a modulation bit per symbol rate of $DM_1$, $DM_2$, $DM_3$, and $DM_4$ where the four downlink time slots are assigned to at least four CPEs where the CPEs will retrieve data located in these slots based on their respective assignment. It is noted that many CPEs may be assigned to any one downlink time slot where each CPE retrieves its data from such a slot based on an address or identifier. Consequently, a CPE may only retrieve data from only a portion of a downlink time slot.

In addition, the uplink slots have a modulation bit per symbol rate of $UM_1$, $UM_2$, $UM_3$, and $UM_4$ where the four uplink time slots are commonly assigned to four CPEs where the CPEs will insert data in these slots based on their respective assignment. It is noted that in some embodiments a CPE may be assigned more than one uplink slot. Further, downlink control information may be located at the start of the downlink time slots and an unreserved time slot may be located at the beginning of the uplink time slots. It is obviously desirable that any CPE associated a cell be able to retrieve data located in the downlink control information time slot regardless of the CPE's location within the cell. In addition, each CPE should be able to insert data into the unreserved uplink time slot.

As described above, in an adaptive bit per symbol rate modulation system the modulation scheme may vary for each CPE and thus for each downlink and uplink time slot. In order to minimize the complexity of CPEs and base stations employed in such a system and reduce the number modulation scheme transitions within a frame, the present invention requires that $DM_1 \leq DM_2 \leq DM_3 \leq DM_4$ and $UM_1 \leq UM_2 \leq UM_3 \leq UM_4$. Thus, ideally, the data in the time slots is arranged from the least complex modulation scheme to the most complex modulation scheme. As noted, this technique reduces the number of modulation transitions, which may simplify the implementation of a base station using this frame structure 80. Note this also enables the base station and CPEs to train on the least complex data, which may lower error rates.

Further, ideally the downlink control information is ideally encoded using the least complex modulation scheme of the system and the information placed in the unreserved uplink time slot is also encoded using the least complex modulation scheme of the system. This ensures that every CPE associated with the cell will be able to receive or encode information within desirable error levels. Ideally, the control information indicates where the modulation transitions occur within the frame. An exemplary process 90 of assigning time slots of frame 80 as shown in FIG. 2 is presented with reference to FIG. 3.

Figure 3:
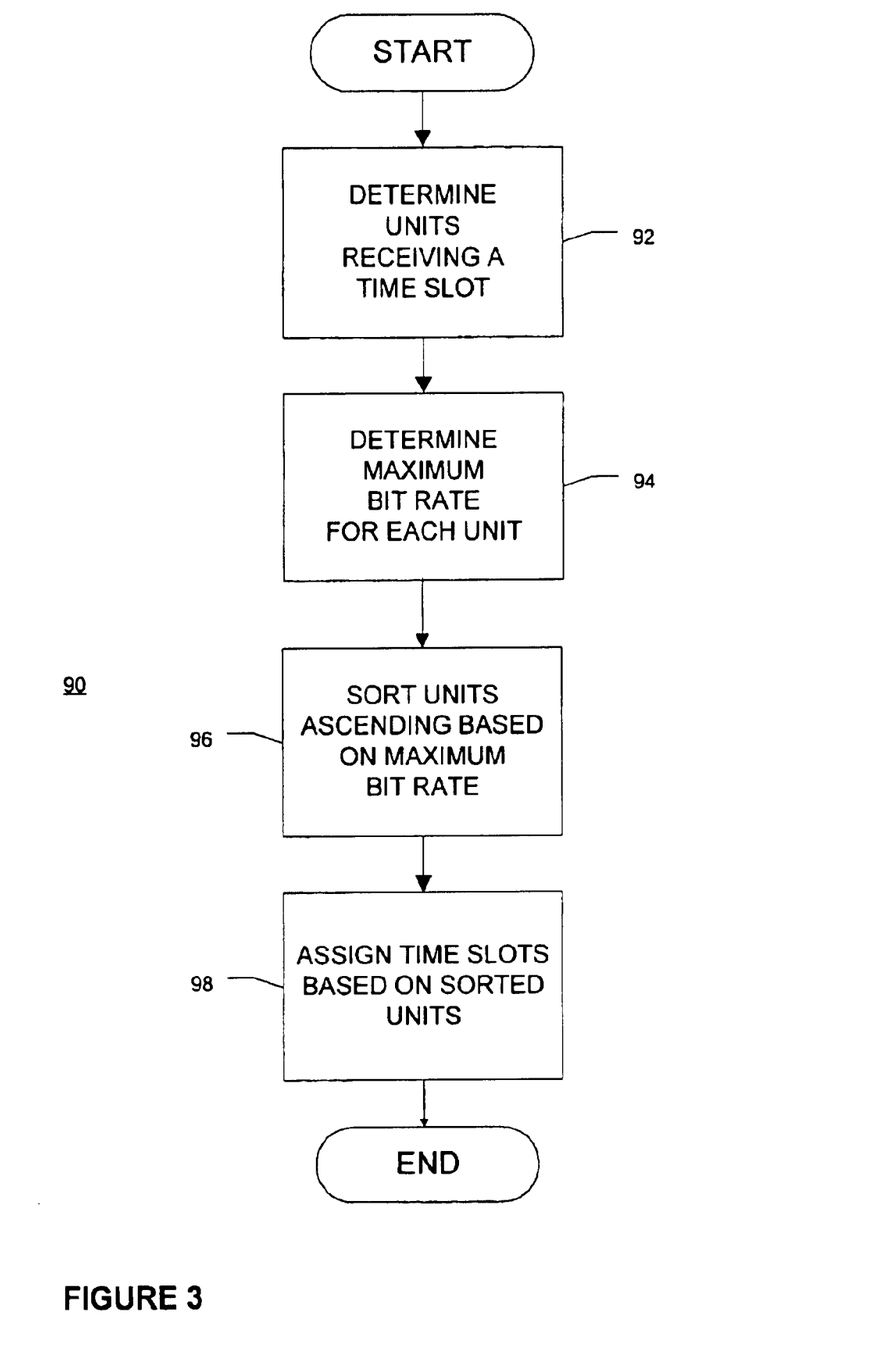
FIG. 3 is a flowchart of an exemplary process of assigning time slots of a TDD frame in accordance with the present invention.

As shown in FIG. 3, the first step, 92 of the process 90 includes determining which CPEs will receive at least one time slot in the next frame. In duplex systems, as described above, a CPE receiving data in a downlink time slot may also transmit data in an uplink time slot. In other systems, such as point to multi-point or multi-cast systems, there may be more downlink time slots than uplink time slots. Then (in step 94) the most complex modulation scheme or maximum bit per symbol rate of the modulation scheme employed by the CPE is determined for each CPE. As stated above, the most complex modulation scheme or maximum bit per symbol rate modulation scheme may be determined as a function of channel interference of signals of a CPE and the maximum desirable error level and the implementation or modem complexity of the CPE.

In a preferred embodiment, Binary Phase Shift Keying ("BPSK") modulation may be selected for the least complex modulation scheme. In BPSK, the bit per symbol rate, $B_1$ of the modulation scheme is one, i.e., each symbol represents one bit. $B_1$ could also be called the modulation scheme efficiency, i.e., how efficient the scheme encodes data. A Quadrature Amplitude Modulation (QAM) of four may be used for an intermediate modulation scheme. In QAM 4, the bit per symbol rate, $B_1$ of the modulation scheme is two, i.e., each symbol represents two bits. Higher quadrature amplitude modulations may be used for more complex modulation schemes, e.g., QAM 64 where the bit per symbol rate, $B_1$ of the modulation scheme is six, i.e., each symbol represents six bits. The modulation complexity or bit per symbol rate modulation scheme may be modified from frame to frame or remain constant for a plurality of frames for a particular CPE. Further, a CPE may select or indicate a desired modulation complexity or scheme.

Upon determination of the modulation complexity or bit per symbol rate modulation scheme to be used to encode data for each of the CPEs, in step 96 the CPEs are sorted in ascending order based on the selected modulation complexity or bit per symbol rate modulation scheme, i.e., from the lowest bit per symbol rate modulation scheme to the highest bit per symbol rate modulation scheme or least complex modulation scheme to the most complex modulation scheme. Finally, the time slots of a frame are allocated or assigned to the CPEs in their sorted order from the lowest bit per symbol rate modulation scheme to the highest bit per symbol rate modulation scheme or from the least complex modulation scheme to the most complex modulation scheme. As noted above, frames are constructed using this process to reduce the complexity of base stations and CPEs that insert or retrieve data therefrom. It is noted that even though modulation schemes may vary from CPE to CPE, the number of symbols to be transmitted in bursts is usually fixed to a predetermined number n×S for all CPEs regardless of their modulation scheme.

It is desirable to simplify the configuration of time slots given fixed bursts of a group of symbols n×S and variable modulation schemes. It is noted that the modulation of L bits generates a fixed number of symbols S where $S=(L/B_1)$ and $B_1$ is the bits per symbol rate of the modulation scheme. To simplify time slot usage and bandwidth management, $(L/B_1)$ or S is ideally an integer multiple of length of the time slot $T_s$ times the baud rate R of the frame. Thus, ideally L bits fit into an integer number of time slots $T_s$ based on the modulation scheme. Note each frame has a fixed number of time slots where the length of the frame (and thus the number of time slots) is determined a function of a maximum desirable delay $T_D$ between signal transmissions and the baud rate R (symbols transmitted per second) of the system. Accordingly for each frame the number of symbols transmitted is equal to $T_D*R$. It is desirable that the number of symbols n×S or $(L/B_1)$ is an integer multiple of the number of symbols transmitted per frame. Thus, it is desirable that the ratio $(T_D*R)/(L/B_1)$ is an integer. When the ratio $(T_D*R)/(L/B_1)$ is an integer then a fixed number of bursts of n×S symbols may be transmitted in each frame. This may simplify frame usage and bandwidth management.

Figure 4:
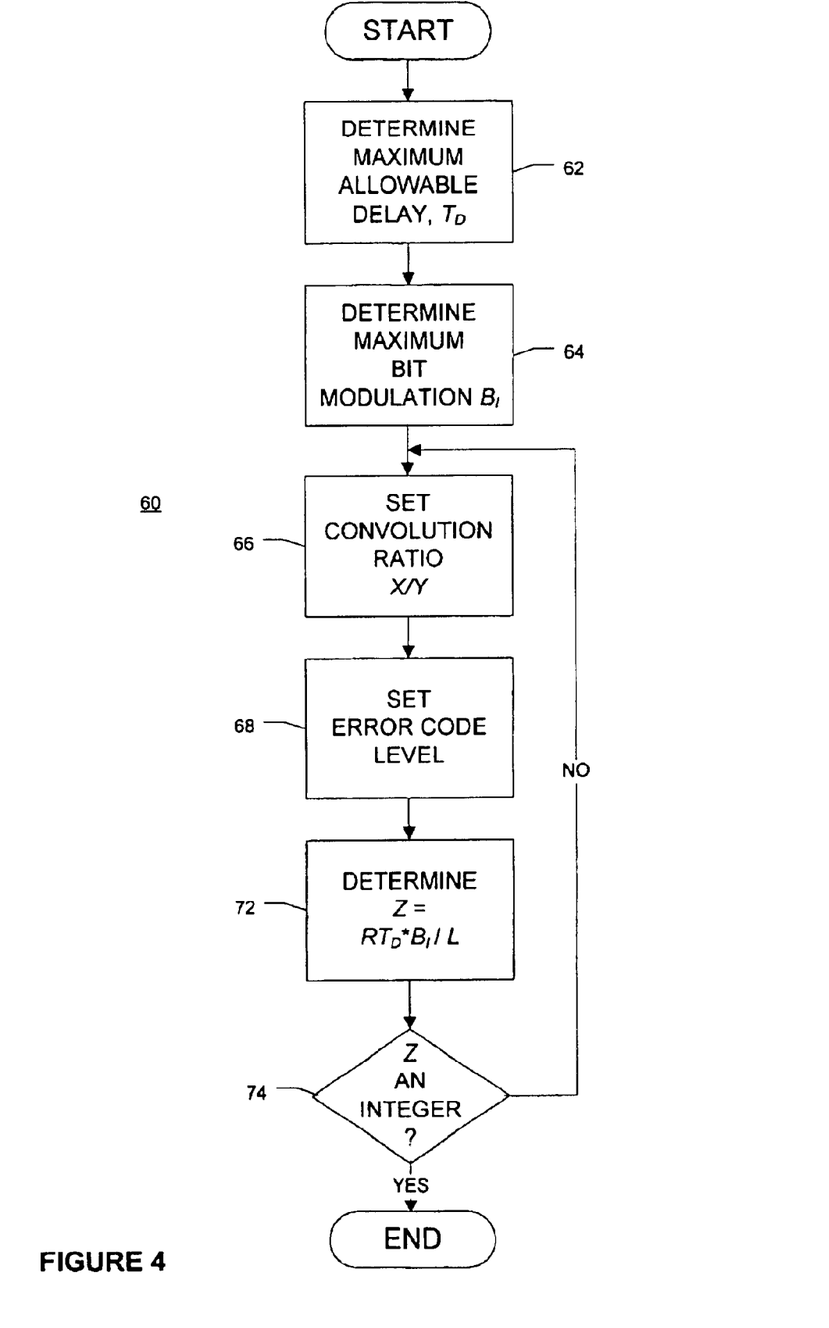
FIG. 4 is a flowchart of an exemplary process of simplifying the configuration of data to be inserted into a TDD frame in accordance with the present invention.

In most systems, the L bits of data represent an encoded signal that includes overhead or Forward Error Correction ("FEC") information where only $L_D$ of the L bits are pure data to be transmitted to a unit or base station. In these systems the number of data bits $L_D$ to be transmitted in a burst may be fixed, e.g., 256, 512, or 1024 bits. The FEC information commonly includes convolutional encoding bits and block codes including error correction encoding bits such as Reed-Solomon (RS(n,k)) data. In other embodiments, the convolutionally encoded data may also be interleaved prior to error encoding. Given that $T_D$ R, and S are fixed due to system constraints and $B_1$ is selected as a function of channel interference and modem or implementation complexity, L is ideally modified to simplify the time slot configuration or the bandwidth management of a frame. As noted, $L_D$ may also be fixed in a system. In such a system L would be determined for each possible modulation scheme of the system. FIG. 4 is a flowchart of a preferred process 60 of configuring or determining L based on $T_D$, R, and $B_1$ for the transmission of data by a unit or a base station so that frame usage is simplified.

As shown in FIG. 4, the first step, 62 of the process 60 determines the maximum allowable delay $T_D$ of the system: As noted above, the delay $T_D$ is set equal to the largest acceptable delay between transmissions of signals between CPEs or units and the base station. In step 64 the maximum bit per symbol rate modulation scheme or most complex modulation scheme that may be employed for the transmission of the $L_D$ bits is determined or selected (the process of which was described above.) Then in step 66 a convolution ratio (x/y) is selected for the $L_D$ data bits. In some embodiments no convolutional encoding is employed. In such embodiments, the ratio of (x/y) is set to 1. The convolutional ratio (x/y) is one of the parameters that may be modified to change the number of bits required to encode the $L_D$ bits of data. At step 68, the other variable parameter, the error encoding level is selected. A block code is used to reduce the Block Error Rate ("BER") of the $L_D$ bits of data to a desirable level. In a preferred embodiment, a Reed-Solomon ("RS") block code is used. The number of bits L required to encode the $L_D$ bits of data is thus set by the selection of the convolutional ratio (x/y) and the error code level.

At step 72, the value of the ratio Z of $(T_D*R)/(L/B_1)$ is determined. The baud rate R is fixed, the delay $T_D$ was determined at step 62, $B_1$ is determined at step 64, and L is determined as function of the parameters selected at steps 66 and 68. When it is determined at step 74 that the ratio Z is not integer, a different convolutional ratio (at step 66) or the error code level (at step 68) may be selected. In a preferred embodiment, the selection of the convolutional ratio and the error code level is varied as a function of the fractional remainder of the ratio Z, i.e., a convergence algorithm may be employed. As noted above, in some embodiments the convolution ratio is fixed to 1. In such embodiments, only the error code or block code level is modified. In order to ensure that the ratio Z is an integer, the number of bits used to generate the block code of data may be greater than necessary to meet the minimum BER. When at step 74, the ratio Z is determined to be an integer, then the process is complete and the block of L bits is optimized or simplified for the modulation scheme or bit per symbol rate $B_1$.

Figure 5:
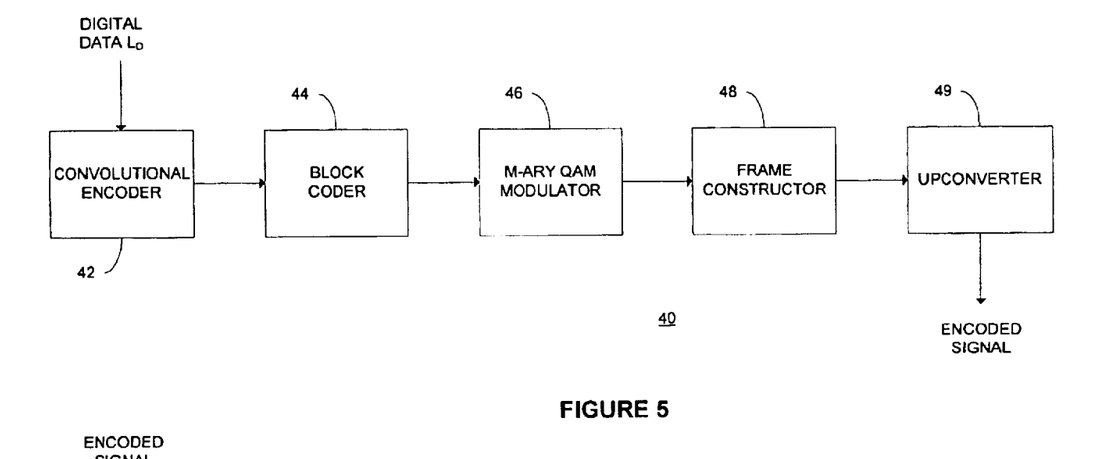
FIG. 5 is a block diagram of an exemplary transmitter for use with the present invention.
Figure 6:
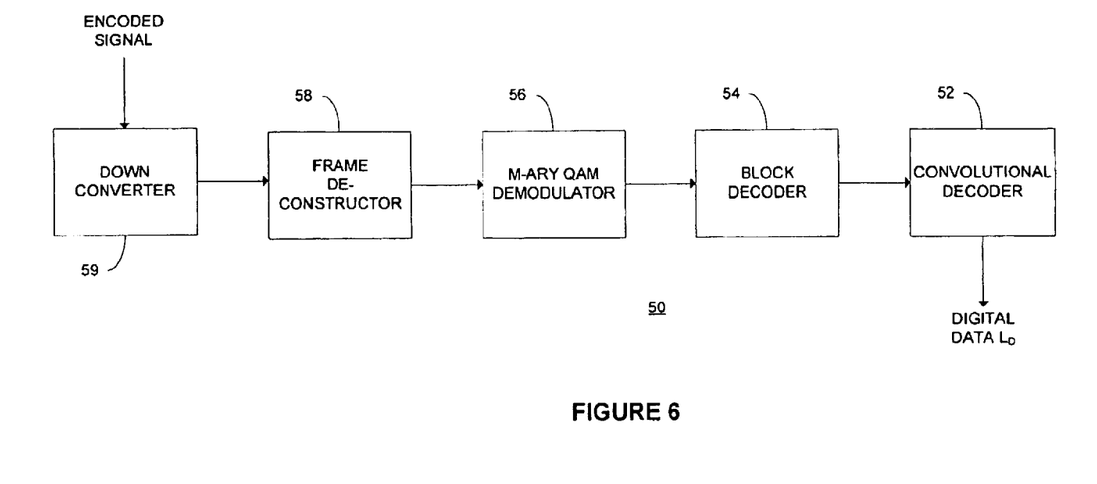
FIG. 6 is a block diagram of an exemplary receiver for use with the present invention.

A transmitter 40 and receiver 50 that may employed to transmit and receive frames of data in accordance with the present invention is presented with reference to FIGS. 5 and 6. FIG. 5 is a block diagram of an exemplary transmitter 40. As shown in this Figure, the transmitter 40 includes a convolutional encoder 42, block encoder 44, M-ary Modulator 46, frame constructor 48, and up-converter 49. The transmitter 40 receives the $L_D$ bits of data and encodes the data to generate L bits of data, packs the L bits of data into a frame and upconverts the frame of data to a transmission frequency. The convolutional encoder 42 and block coder 44 supply the FEC data that converts the $L_D$ bits of data into L bits of data. In particular, the convolutional encoder 42 uses the selected ratio (x/y) to encode the $L_D$ bits of data. The block coder uses the selected code level to encode the convoluted data to produce the encoded L bits of data to be transmitted to a base station or unit.

Then, the M-ary modulator converts the L bits of data into the n×S symbols based on the selected bit per symbol rate $B_1$. Due to the selection of the convolution ratio and error code level, the n×S symbols can be inserted into an integer number of times slots of a frame. The frame constructor 48 ideally inserts the n×S symbols into time slots of a frame based on the process presented with reference to FIG. 3 above, i.e., in order of the modulation scheme (from least complex to the most complex modulation scheme). Up-converter 49 frequency shifts the packed frame of data to a frequency suitable for transmission between a CPE or unit and base station based on techniques known to those of skill in the art.

The receiver 50 shown in FIG. 6 converts the frequency shifted frame of data back into groups of $L_D$ bits of data. As shown in FIG. 6, the receiver 50 includes a down-converter 59, frame deconstructor 58, M-ary demodulator 56, block decoder 54, and convolutional decoder 52. The down-converter 59 frequency shifts the received signal back to baseband using techniques known to those of skill in the art. The frame deconstructor separates the frame into groups of n×S symbols for processing by the remaining components of the receiver 50. When the receiver 50 is part of a subscriber unit, the frame deconstructor selects one of the groups of n×S symbols where the data is directed to the subscriber unit. Block decoder 54 decodes the n×S symbols using techniques known to those of skill in the art. Then, the convolutional decoder decodes the data to produce $L_D$ bits of data.

Figure 7:
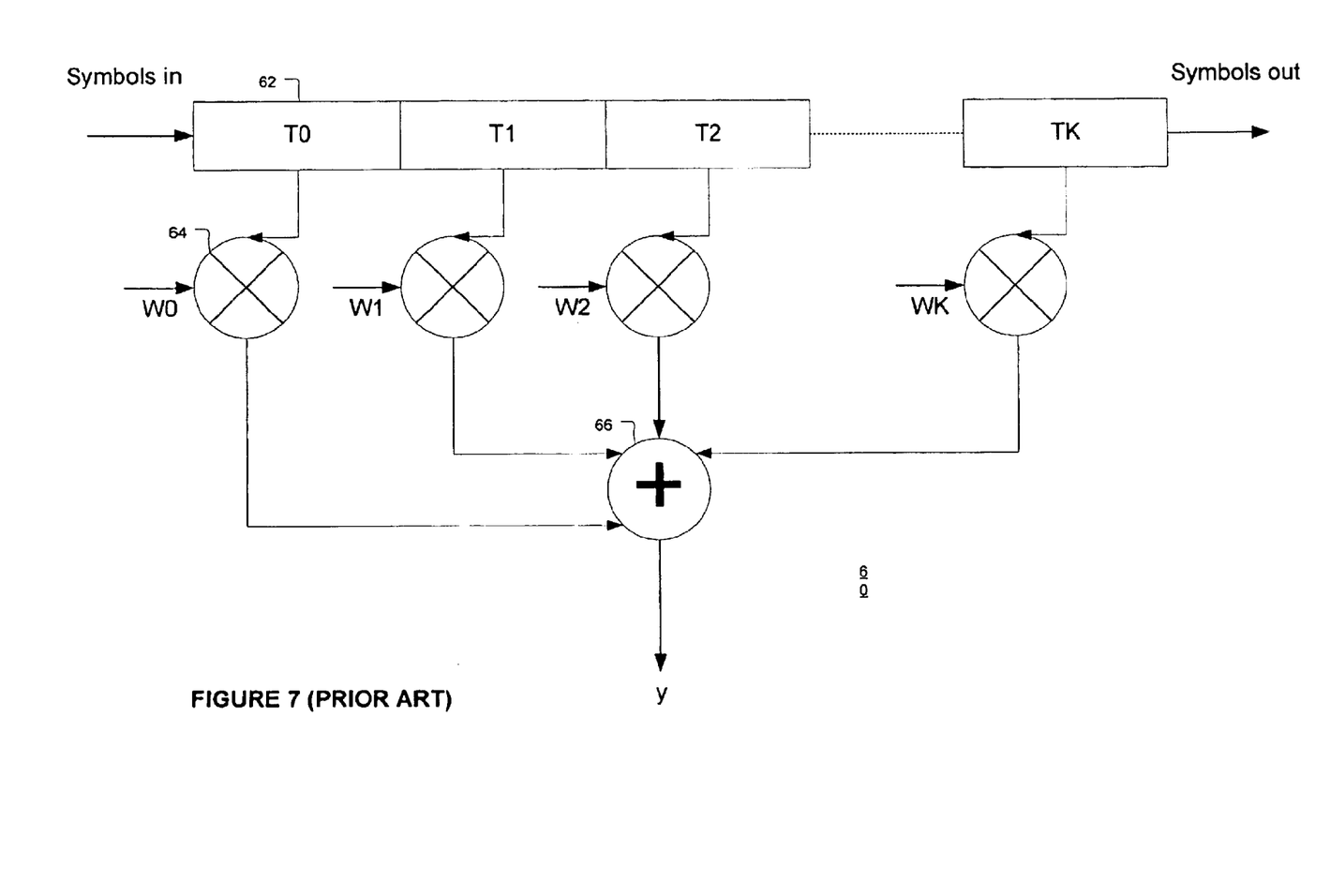
FIG. 7 is a block diagram of a prior art Finite Impulse Response ("FIR") filter suitable for use with the present invention.

The techniques and systems presented above may be modified while still falling within the scope of the appended claims. For example, symbol shaping may also be employed in a preferred embodiment to avoid spectrum spillage due to possible abrupt changes in modulation schemes in a frame as described above. Symbol shaping is commonly accomplished by filtering the n×S symbols via a Finite Impulse Response ("FIR") filter where an exemplary prior art FIR filter 60 is shown in FIG. 7. As shown in FIG. 7, the FIR filter 60 includes k multipliers and a summation node 66. Symbols S are received sequentially and stored in filter taps T0 to Tk 62. Each multiplier 64 has a tap weight W0 to Wk and tap T0 to Tk associated with a symbol stored in the taps 62. As can be seen from FIG. 7, the FIR filter 60 generates an output, y having the form:

$$y = \sum_{i=0}^{k} Wi * Ti.$$

It is noted that different modulation schemes, such as different QAM schemes (QAM-4, QAM-16, QAM-64) employ different "alphabets" to represent the x symbols of the scheme. For example, QAM-4 has four different symbols, QAM-16 has sixteen different symbols and QAM-64 has sixty-four different symbols. In addition, different modulation schemes may have different gains that are applied to the symbols for transmission due to varying back-off requirements. In prior art variable modulation systems when the modulation scheme changes, the memory of the FIR filter is not normally reset while the weights W0 to Wk are instantly changed to weights optimized for the modulation scheme or symbols of the scheme to prevent spectrum spillage.

Figure 8A:
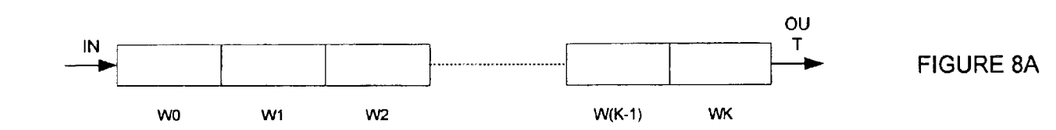
FIGS. 8A to 8F are diagrams illustrating a method of the invention that changes weights of a FIR filter as new symbols propagate through the filter.
Figure 8B:
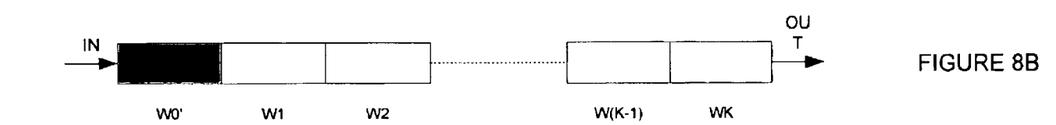
Figure 8C:
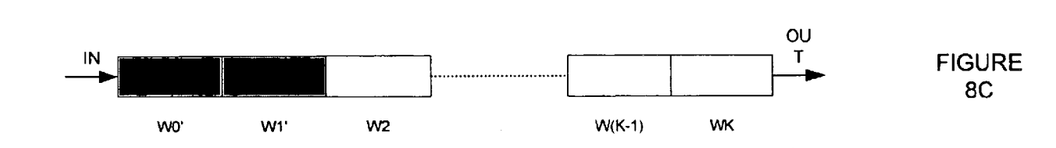
Figure 8D:
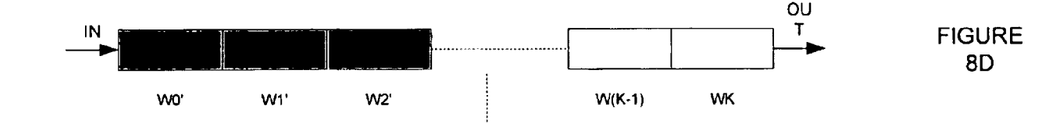
Figure 8E:
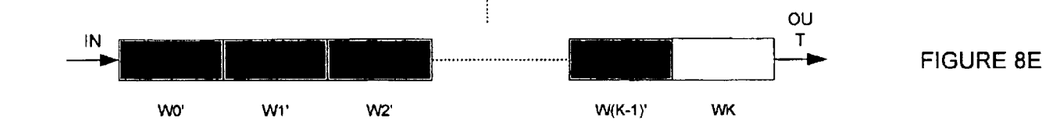
Figure 8F:
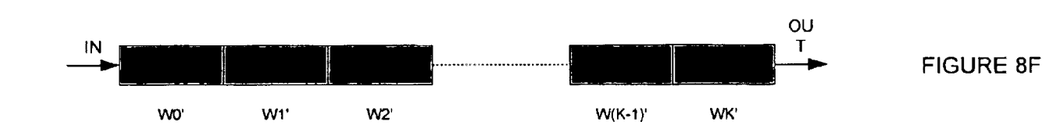

This solution is not ideal, however, because the weights are then not optimized for the symbols in the memory (taps 62) of the filter that correspond to the previous modulation scheme or rate. One solution is to employ one set of weights for all modulation schemes. This solution is also not ideal, however, since the FIR filter is then not optimized for the alphabet of symbols for each modulation scheme. To prevent spectrum spillage and optimize the FIR filter 60, the present invention changes the filter taps sequentially with each new symbol from the new modulation scheme as shown in FIGS. 8A to 8F. In particular, the weight that corresponds to the first new symbol of a new modulation scheme is modified as the first new symbol propagates through the filter 60. In FIG. 8A, the filter weights W0 to Wk are optimized for the modulation scheme of the symbols currently being processed by the FIR filter 60. In FIG. 8B, the first symbol of a new modulation scheme is received in T0 of the FIR filter 60. At this point as shown in FIG. 8B, the present invention replaces the filter weight, W0 associated with T0 with a new filter weight W0' where W0' is optimized for the modulation scheme of the first new symbol stored in T0. Then, when the next symbol from the new modulation scheme is received and stored in T0 and the first new symbol is shifted to T1, the present invention replaces the filter weight, W1 associated with T1 with a new filter weight ' where ' is also optimized for the new modulation scheme as shown in FIG. 8C. This process is repeated as shown in FIGS. 8D to 8F until all the symbols stored in the taps 62 the FIR filter 60 belong to the new modulation scheme and all the filter weights W0 to Wk are associated with or optimized for the new modulation scheme. This technique reduces spectrum spillage while optimizing the weights employed in the FIR filter 60 to shape the symbols or varying modulation schemes.

Accordingly, it is to be understood that the invention is not to be limited by the specific illustrated embodiment, but only by the scope of the appended claims.

What is claimed is:

1. A method for assigning portions of at least two downlink time slots of a plurality of downlink time slots of a frame to at least two units where modulated data is stored in the portions of the at least two downlink time slots and the modulation scheme employed to generate the modulated data may vary for each of the at least two units, the method comprising the steps of:
   (a) determining the complexity of the modulation scheme employed by the at least two units in generating the modulated data for the at least two units; and (b) assigning the portions of the at least two time slots to the at least two units based on the complexity of the modulation scheme employed by the at least two units in generating the modulated data for the at least two units.

2. The method according to claim 1, wherein at step (b) the portions of the at least two downlink time slots are assigned to the at least two units from the least complex modulation scheme to the most complex modulation scheme.

3. The method according to claim 1 wherein step (b) includes the steps of:
(a) ordering the at least two units as a function of the complexity of the modulation scheme employed to generate the modulated data for each of the at least two units; and
(b) assigning the portions of the at least two time slots to the at least two units based on the order of the at least two units.

4. The method according to claim 3, wherein step (b) of claim 3 includes assigning the portions of the at least two time slots to the at least two units from the least complex modulation scheme to the most complex modulation scheme.

5. The method according to claim 4, wherein the frame is a time division duplex frame.

6. The method according to claim 3, wherein the method further assigns at least two uplink time slots of a plurality of uplink time slots of a frame to at least two transmit units where modulated data is stored in the at least two uplink time slots and the modulation scheme employed to generate the modulated data may vary for each of the at least two transmit units, the method further comprising the steps of:
(a) determining the complexity of the modulation scheme employed to generate the modulated data for the at least two transmit units; and
(b) assigning the at least two uplink time slots to the at least two transmit units based on the complexity of the modulation scheme employed to generate the modulated data for the at least two transmit units.

7. The method according to claim 6, wherein at step (b) of claim 6 the at least two uplink time slots are assigned to the at least two transmit units from the least complex modulation scheme to the most complex modulation scheme.

8. The method according to claim 6 wherein step (b) includes the steps of:
(a) ordering the at least two transmit units as a function of the complexity of the modulation scheme employed to generate the modulated data for each of the at least two transmit units; and
(b) assigning the at least two uplink time slots to the at least two transmit units based on the order of the at least two transmit units.

9. The method according to claim 8, wherein step (b) of claim 8 includes assigning the at least two uplink time slots to the at least two transmit units from the least complex modulation scheme to the most complex modulation scheme.

10. The method according to claim 9, wherein the frame is a time division duplex frame.

11. The method according to claim 9, wherein the method further assigns at least two uplink time slots of a plurality of uplink time slots of a frame to at least two transmit units where modulated data is stored in the at least two uplink time slots and the bit per symbol rate of the modulated data may vary for each of the at least two transmit units, the method further comprising the steps of:
(a) determining the bit per symbol rates of the modulated data for the at least two transmit units; and
(b) assigning the at least two uplink time slots to the at least two transmit units based on the bit per symbol rates of the modulated data for the at least two transmit units.

12. The method according to claim 11, wherein at step (b) of claim 6 the at least two uplink time slots are assigned to the at least two transmit units from the lowest bit per symbol rate to the highest bit per symbol rate.

13. The method according to claim 11, wherein step (b) includes the steps of:
(a) ordering the at least two transmit units as a function of the bit per symbol rate of the modulated data for each of the at least two transmit units; and
(b) assigning the at least two uplink time slots to the at least two transmit units based on the order of the at least two transmit units.

14. The method according to claim 13, wherein step (b) of claim 13 includes assigning the at least two uplink time slots to the at least two transmit units from the lowest bit per symbol rate to the highest bit per symbol rate.

15. A method for assigning portions of at least two downlink time slots of a plurality of downlink time slots of a frame to at least two units where modulated data is stored in the portions of the at least two downlink time slots and the bit per symbol rate of the modulation scheme employed to generate the modulated data may vary for each of the at least two units, the method comprising the steps of:
(a) determining the bit per symbol rate of the modulation scheme employed by the at least two units in generating the modulated data for the at least two units; and
(b) assigning the portions of the at least two time slots to the at least two units based on the bit per symbol rate of the modulation scheme employed by the at least two units in generating the modulated data for the at least two units.

16. The method according to claim 15, wherein at step (b) the portions of the at least two downlink time slots are assigned to the at least two units from the lowest bit per symbol rate modulation scheme to the highest bit per symbol rate modulation scheme.

17. The method according to claim 15, wherein step (b) includes the steps of:
(a) ordering the at least two units as a function of the bit per symbol rate of the modulation scheme employed to generate the modulated data for each of the at least two units; and
(b) assigning the portion of the at least two time slots to the at least two units based on the order of the at least two units.

18. The method according to claim 17, wherein step (b) of claim 12 includes assigning the portion of the at least two time slots to the at least two units from the lowest bit per symbol rate modulation scheme to the highest bit per symbol rate modulation scheme.

19. A method for determining the modulation scheme of a frame having a plurality of downlink time slots where one of the plurality of downlink slots contains control information and the modulation scheme employed to generate the modulated data for the plurality of downlink time slots may vary for each of the plurality of downlink slots and where the frame may be transmitted to a plurality of units where each of the plurality of units may support a modulation scheme having a maximum complexity, the method comprising the steps of:

a) determining the complexity of the modulation scheme employed by the plurality of units in generating modulated data for the plurality of units, b) determining the lowest modulation complexity employed by each of the plurality of units; and c) setting the modulation complexity of the downlink slot of the plurality of downlink slots that contains control information to the determined lowest modulation complexity.

20. The method according to claim 19, wherein the downlink slot of the plurality of downlink slots that contains control information is the first downlink slot in time order of the plurality of downlink slots.

21. The method according to claim 21 further comprising the steps of:

(a) determining the complexity of the modulation scheme employed to generate the modulated data for at least two units of the plurality of units; and (b) assigning at least two time slots of the plurality of time slots to the at least two units based on the complexity of the modulation scheme employed to generate the modulated data for the at least two units.

22. The method according to claim 21, wherein at step (b) the at least two downlink time slots are assigned to the at least two units from the least complex modulation scheme to the most complex modulation scheme.

23. The method according to claim 21 wherein step (b) includes the steps of:

(a) ordering the at least two units as a function of the complexity of the modulation scheme employed to generate the modulated data for each of the at least two units; and (b) assigning the at least two time slots to the at least two units based on the order of the at least two units.

24. The method according to claim 23, wherein step (b) of claim 23 includes assigning the at least two time slots to the at least two units from the least complex modulation scheme to the most complex modulation scheme.

25. The method according to claim 24, wherein the frame is a time division duplex frame.

* * * * *